No. 623,261. Patented Apr. 18, 1899.
J. B. SEAGER.
MACHINE FOR MANUFACTURING BUILDING TILES.
(Application filed Jan. 15, 1898.)
(No Model.) 5 Sheets—Sheet 1.

Witnesses: Inventor:
James B. Seager,
By Dyrenforth & Dyrenforth,
Attys

No. 623,261. Patented Apr. 18, 1899.
J. B. SEAGER.
MACHINE FOR MANUFACTURING BUILDING TILES.
(Application filed Jan. 15, 1898.)

(No Model.) 5 Sheets—Sheet 3.

Witnesses
Inventor:
James B. Seager,
By Dyrenforth and Dyrenforth,
Attys.

No. 623,261. Patented Apr. 18, 1899.
J. B. SEAGER.
MACHINE FOR MANUFACTURING BUILDING TILES.
(Application filed Jan. 15, 1898.)
(No Model.) 5 Sheets—Sheet 4.
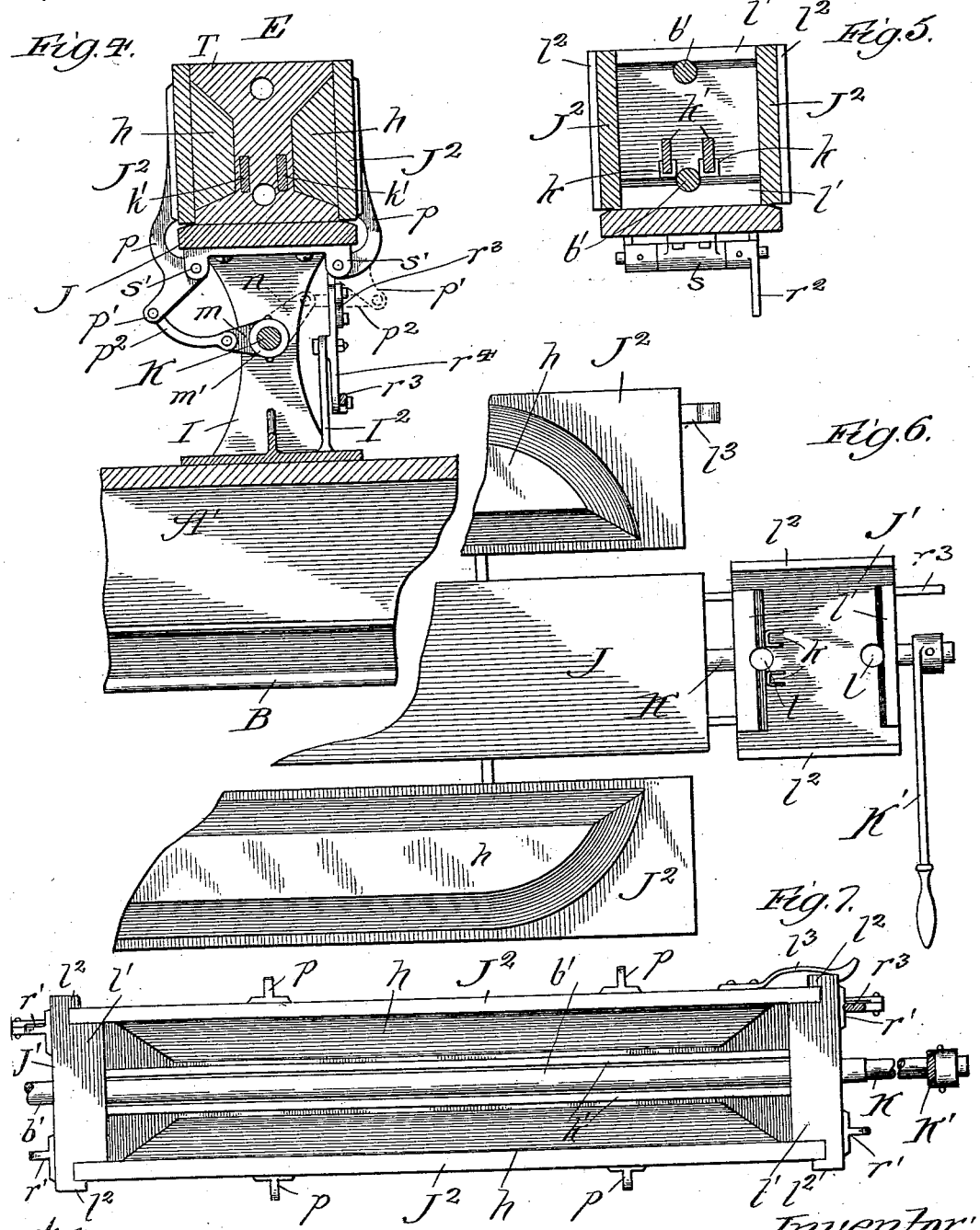
Witnesses:
Inventor:
James B. Seager,
By Dyrenforth & Dyrenforth,
Attys.

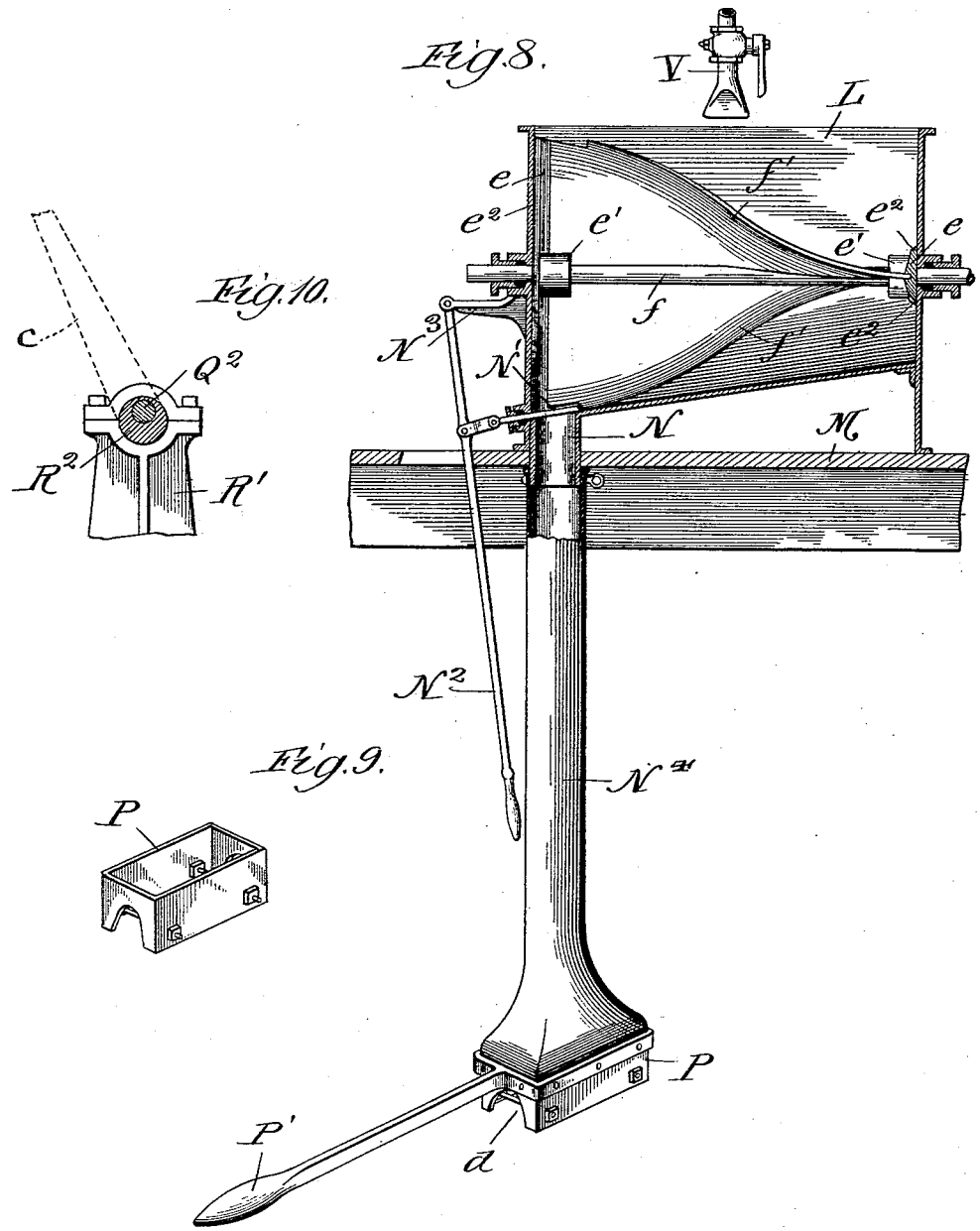

UNITED STATES PATENT OFFICE.

JAMES B. SEAGER, OF CHICAGO, ILLINOIS, ASSIGNOR TO THE MACKOLITE FIREPROOFING COMPANY, OF SAME PLACE.

MACHINE FOR MANUFACTURING BUILDING-TILES.

SPECIFICATION forming part of Letters Patent No. 623,261, dated April 18, 1899.

Application filed January 15, 1898. Serial No. 666,824. (No model.)

*To all whom it may concern:*

Be it known that I, JAMES B. SEAGER, a citizen of the United States, residing at Chicago, in the county of Cook and State of Illinois, have invented a new and useful Improvement in Machines for Manufacturing Building-Tiles, of which the following is a specification.

My invention relates to an improved machine for manufacturing tiles, more particularly of the class used in the floors of steel-constructed buildings; and my primary object is to provide a machine for manufacturing tiles of this description which enables an article of uniform strength to be produced at a comparatively low cost.

Generally stated, the machine comprises a horizontally-disposed intermittently-revolving platform of novel construction carrying a series of peculiarly-constructed molds, a mixing-chamber above the path of the molds provided with a stirrer, means for revolving said stirrer, means for communicating to the platform the requisite intermittent movement, and means for regulating the discharge from the mixing-chamber to the molds.

Figure 1:
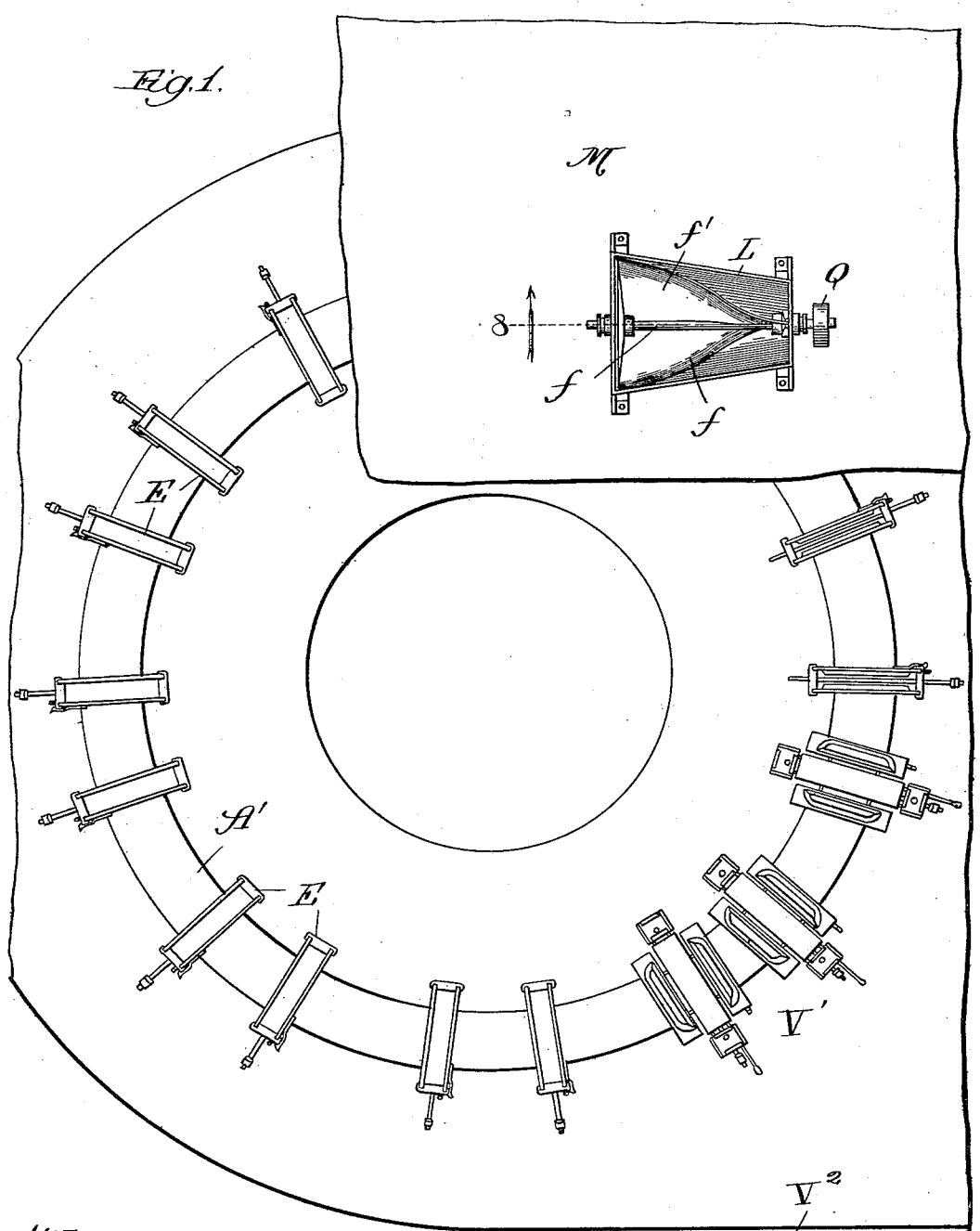
Figure 2:
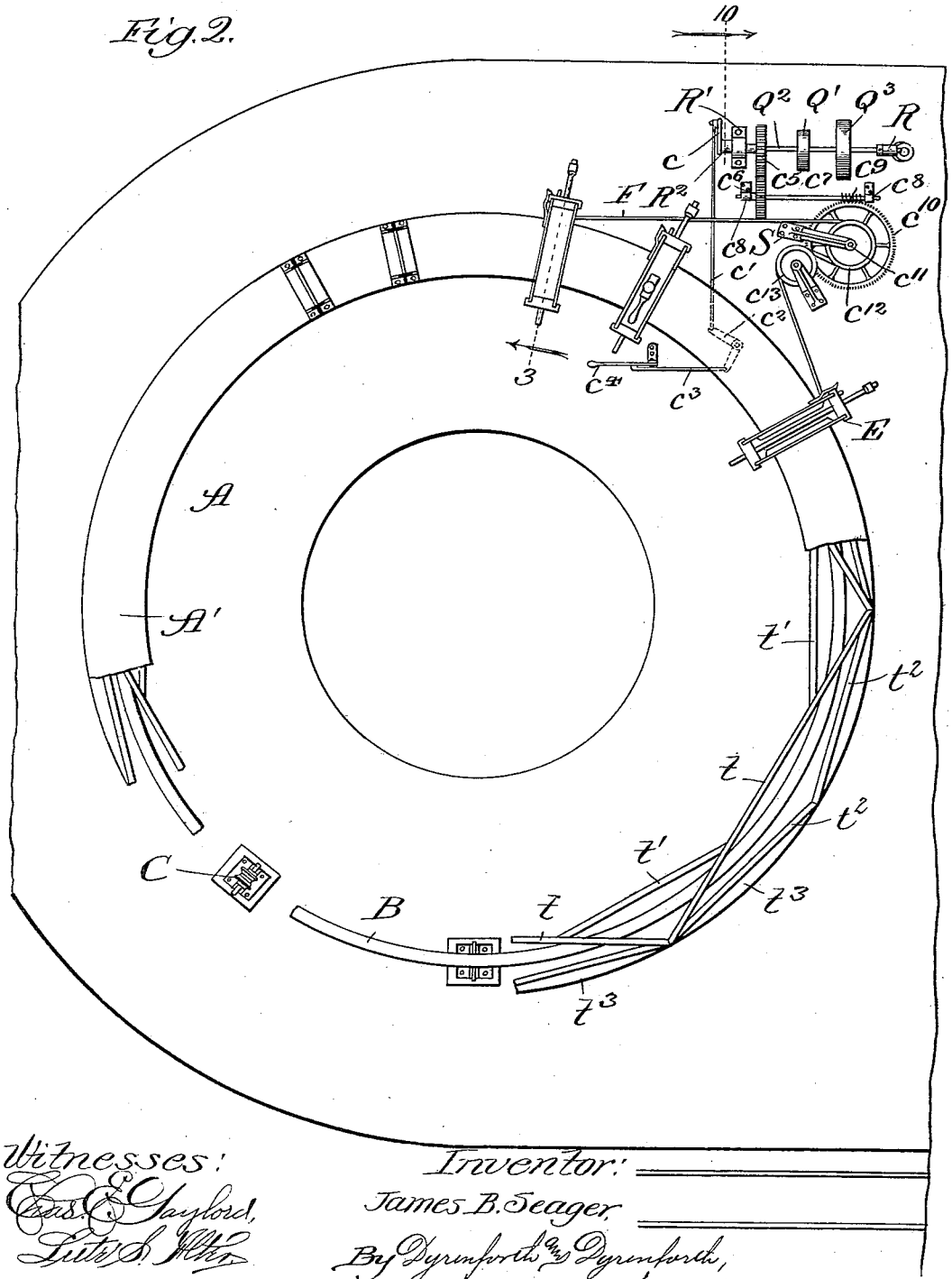
Figure 3:
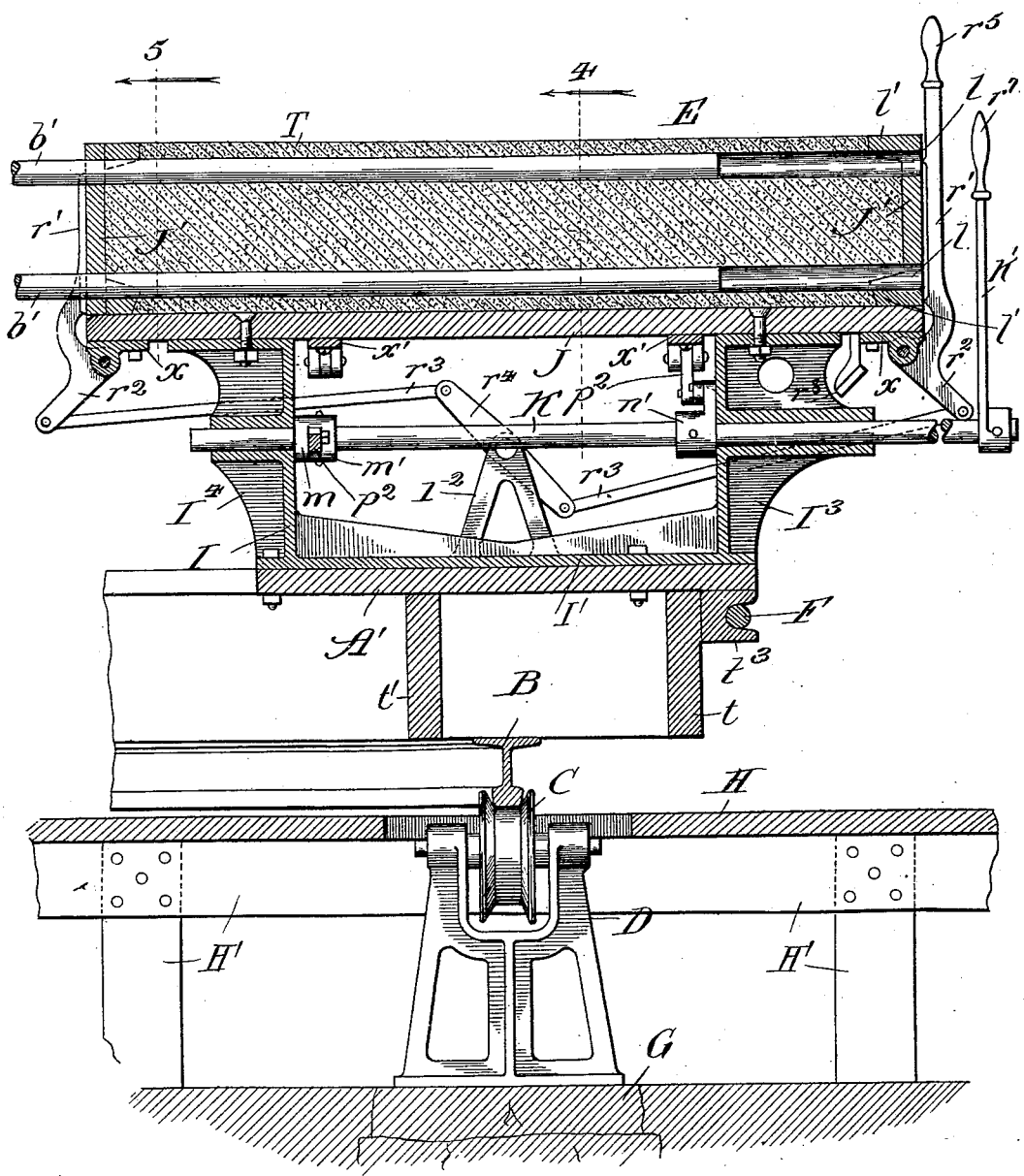

In the accompanying drawings, Figure 1 is a broken plan view of my improved tile-making machine, showing the relative positions of the revolving platform and the mixing-chamber; Fig. 2, a plan view with the mixing-chamber and its platform removed and certain parts of the revolving platform torn away to show the manner of mounting and propelling it; Fig. 3, a section on line 3 of Fig. 2 longitudinally through one of the molds and transversely through the portion of the revolving platform which supports it; Fig. 4, a section transversely through the mold as shown at line 4 of Fig. 3; Fig. 5, a transverse section at line 5 of Fig. 3; Fig. 6, a broken view of one of the molds in its open or "thrown-down" position; Fig. 7, a top plan view of a closed mold; Fig. 8, a sectional view of the mixer and a view in perspective of the discharge-chute adapted to be dropped into the mold to be filled; Fig. 9, a view in perspective of the lower end or orifice of the discharge-chute; and Fig. 10, a section on line 10 of Fig. 2, showing an eccentrically-mounted driving-shaft, by means of which the intermittent motion is communicated to the revoluble platform.

A is a circular annular platform supplied on its under side with a circular rail B, which rests, preferably, upon a series of grooved rolls C, journaled in pillow-blocks D, the platform being of sufficient diameter to accommodate on its upper surface any desired number of molds E, one of twenty-four feet in diameter being large enough to accommodate about twenty-four molds of ordinary size. The platform preferably is made up of planks $t$, set on edge and joined at the ends in the form of chords of a circle, braces $t'$, joining the chords or planks $t$, chords $t^2$, subdividing the arcs subtended by the chords $t$, and exteriorly rounded and grooved strips $t^3$, completing the circle and affording a channel for the drive-cable F. The various timbers mentioned are securely joined together in any suitable manner and covered with an annular flooring A'. Beneath the center of the annular platform is the circular rail B, preferably of steel and securely joined to the chords $t$ at the points of intersection.

The pillow-blocks D are arranged at equal intervals beneath the rail B and in Fig. 3 are shown as resting upon supports G upon the ground-level and beneath the level of the floor H. The rolls G project slightly above the floor-level to give sufficient clearance to the platform. The floor is shown in Fig. 3 as resting on supports H'.

At intervals upon the upper surface of the platform are arranged radially-extending chairs or standards I, preferably of cast metal and carrying the molds E and the mechanism for opening and closing them. For producing the improved tile herein referred to it is necessary that the molds be made to open both at the sides and ends, though the claims upon the general structure of the machine are not to be thereby limited. Each standard I comprises a radially-extending base-plate I', bolted to the platform-flooring A', a central (longitudinally) standard I², and end standards I³ and I⁴. To the flanged tops of the end standards is bolted the mold-bottom J, supplied on the lower side, at the ends, with cross-strips $x$, provided with lugs $s$, Fig. 5, and between the ends with cross-strips $x'$, provided with perforated lugs $s'$, Figs. 3 and 4. The mold is supplied with end pieces $J'$, each provided with hinges $r$ $r'$, pivotally joined to the lugs $s$. The hinges $r'$ are provided with lever-arms $r^2$, which are linked by means of rods $r^3$ to the ends of a lever $r^4$, fulcrumed on the standard $I^2$. The hinge $r'$ at the outer end of the mold is provided with an extension $r^5$, affording an operating-handle for simultaneously lowering and raising the ends of the mold. The mold is likewise provided with side pieces $J^2$, each having a set of hinges $p$, pivoted to the lugs $s'$. One hinge of each set is provided with a depending lever-arm $p'$, and these arms are joined by links $p^2$ and $p^3$ to arms $n$ and $m$, carried by collars $n'$ and $m'$, respectively, rigidly mounted upon a rock-shaft $K$, journaled in the end standards $I^3$ $I^4$. At the extreme outer end of the rock-shaft is an operating-handle $K'$, by means of which the sides of the mold may be simultaneously raised or lowered. The end pieces $J'$ are provided near the top and bottom with core-openings $l$, internally at the top and bottom with cross-strips $l'$ of a cross-section like that shown in Fig. 3, which serve to give to the tile the necessary end formation, and externally with cleats $l^2$, Fig. 7, which embrace the ends of the side pieces when the mold is closed, the end pieces being held in this position by means of a spring-catch $l^3$, secured to one of the sides of the mold. The end pieces are further provided internally and just above and practically flanking the lower core-perforation with slotted lugs $k$, which serve to definitely locate in the mold-laths $k'$, Fig. 5, which are put in place before the charge is introduced into the mold. The side pieces of the mold are provided internally with what may be termed "core-strips" $h$ of a cross-section such as that shown in Fig. 4, but rounded at the upper corners, as shown in Fig. 6, and thus adapted to give to the tile the I-beam cross-section shown in said Fig. 4 and an elongated arched-recess appearance when viewed in side elevation, as will be readily understood. The improved tile produced in this mold forms the subject-matter of an application, Serial No. 688,146, filed August 9, 1898, and reference is had to said application for a fuller description thereof than is necessary for the purpose of the present application.

In Figs. 1 and 8 is shown a mixing-chamber $L$, into which the charge, consisting of a measured quantity of water, calcined gypsum, and such other chemicals as may be desired by the individual manufacturer, is introduced, to be thoroughly mixed preparatory to charging the molds or such a number of them as may be conveniently accommodated at one charge. The mixing-chamber preferably is of the half-conical or funnel shape shown and rests upon a stationary platform $M$ at a convenient distance—say a height of six to ten feet—above the revolving platform. Journaled in the ends of the chamber is a shaft $f$, which carries two spiral-shaped stirrer and propeller blades $f'$, which fit closely the inner conical surface of the mixing-vat. At their ends the blades $f'$ fit into grooved arms $e$, carried by collars $e'$, rigid with the shaft. The arms afford sockets for the ends of the stirrer-blades throughout their width and are provided with chisel edges $e^2$, which serve effectually to scrape the ends of the vat clean as the blades rotate. The blades are so set with reference to the direction of rotation of the shaft that the material is conveyed toward the large end of the vat, where is located a discharge-chute $N$, guarded by a slide-valve $N'$, operated by a second-class lever $N^2$, pivotally joined at its upper end to a lug $N^3$ upon the end of the vat. The lever $N^2$ extends downward through a slot in the platform $M$ and is of sufficient length to be grasped and operated by a workman on the floor below. Joined to the spout $N$ is a flexible tube $N^4$, provided at its lower end with a rectangular-shaped nozzle $P$, having at its ends arch-shaped openings $d$ and provided with a rigid handle $P'$, which serves as a means for transferring the hose from mold to mold as well as a means for holding the nozzle firmly during the pouring operation. The result accomplished by the peculiar formation of the nozzle is hereinafter mentioned in the description of the operation of the machine.

Motion is communicated to the shaft $f$ through the medium of a pulley $Q$, having belt connection (not shown) with a pulley $Q'$, Fig. 2, on a drive-shaft $Q^2$, journaled in standards $R$ $R'$ upon the floor beneath. Motion is communicated to the shaft from any suitable source through the medium of a pulley $Q^3$. The shaft $Q^2$ is eccentrically journaled at one end in one end of a short rock-shaft $R^2$, which is provided at the other end with a lever-arm $c$, joined by connecting rods and levers $c'$, $c^2$, and $c^3$ to an operating-lever $c^4$, conveniently located at the hand of the workman operating the discharge-valve. The standard $R$ is pivoted vertically to permit lateral movement of the opposite end of the shaft $Q^2$. Upon the shaft $Q^2$ is a gear $c^5$, (which may be friction or cog,) engaging a similar gear $c^6$ upon a shaft $c^7$, journaled in standards $c^8$. The shaft $c^7$ carries a worm $c^9$, which engages a horizontally-disposed worm-wheel $c^{10}$, journaled in a suitable vertically-disposed bracket $S$, and whose shaft $c^{11}$ carries a sheave $c^{12}$, over which the driving-cable $F$ passes. The cable is given a suitable tension by means of a tightening-sheave $c^{13}$.

It thus appears that the revolving platform $A$ is sustained by suitable supporting means beneath the annulus, itself revolved by driving mechanism applied at its periphery, both supporting and driving means being thus independent of any central supporting or driving mechanism, leaving the space within the annulus free to be occupied by workmen standing upon the floor H, which latter extends within and is beneath the level of the annulus or platform.

T is the tile, preferably supplied in the course of manufacture with perforations $b$ by means of cores $b'$. (Shown in Fig. 3 as partly withdrawn.)

The operation of the machine is as follows: Motion is communicated to the drive-shaft $Q^2$ through the medium of the pulley $Q^3$ from any suitable source of power, and by means of belt connection between the pulleys $Q'$ and $Q$ a continuous rotary motion is imparted to the stirrer-shaft $f$. A workman on the platform M introduces a measured quantity of water through a nozzle V (shown in Fig. 8 as provided with an elongated orifice for the purpose of directing the water in a sheet longitudinally of the mixing-vat) in order to thoroughly wash the stirrer-blades $f'$ at each introduction of a new charge. A measured quantity of calcined gypsum and such other chemicals in small proportion as it may be desirable to use is next introduced into the vat. After the mixing operation has proceeded until the ingredients are thoroughly mixed, the whole being reduced to the consistency of molasses, a workman standing upon the floor H within the annular platform A grasps the handle $P'$ of the hose $N^4$ with one hand and directs the nozzle to the mold which happens to be beneath it and which has previously been equipped with cores and laths, as above described, and with the other hand grasps the lever $N^2$ and opens the valve $N'$. In order to make sure that no air bubbles or holes are left in the tile being formed, the workman stirs the liquid plaster-of-paris while the mold is being filled. The formation of the nozzle P serves to direct the issuing material toward the ends of the mold, and thus prevent splashing. Were it not for this provision the material would strike against the sides of the mold with much force and produce an objectionable splashing. After the mold is properly filled the workman closes the valve $N'$ and still retaining his hold upon the handle $P'$ with one hand with the other hand grasps the hand-lever $c^4$ and shifts the rock-shaft $R^2$ to cause the gear $c^5$ to mesh with the gear $c^6$, and thus through the medium of the shaft $c^7$, the worm, and worm-wheel $c^9$ $c^{10}$ to set the annular platform in motion. As soon as a new mold has come beneath the nozzle P the hand-lever $c^4$ is again moved to stop rotation of the platform, when the filling operation is repeated. Workmen stationed about the platform, on the outer and inner sides thereof, level off the mold, remove the cores through the ends thereof, and open the end pieces of the mold by means of the hand-lever $r^5$ and the sides of the mold by means of the hand-lever $r^7$. The end pieces fall to a horizontal and are there held by the arms $r^2$ striking against a stop $r^8$. The side pieces fall to a horizontal and are there held by means of the link $p^2$ striking against the shaft K. By the time the molds have reached the point marked $V'$ (shown in Fig. 1) the tiles are sufficiently hardened to be removed by the workmen and placed upon a truck $V^2$ to be transferred to the dry-kilns. After the tile is removed from the mold another workman closes the mold, places in position the cores and laths above referred to, and by the time the mold reaches the spout $N^4$ it is again ready for filling.

It is desirable that the mixing-chamber L be made not too large. I have found in practice that if a charge sufficient to fill four molds be introduced at one time and the mixing-chamber be completely emptied before the introduction of a new charge satisfactory results are attained, it being possible in this manner to keep the mixing-chamber and the blades free from incrustation. As shown in Fig. 8, the valve $N'$ is so located that it will be cleansed by the rotation of the blades $f'$, the latter being cut away somewhat to accommodate the valve.

It is obvious that changes in the details of construction may be made without departing from the spirit of my invention. For instance, it would be possible to change the construction of the revolving platform and to make the same of steel. The molds also may be of cast metal, in which case it would not be necessary to have the same thickness of mold as is shown in the drawings.

What I claim as new, and desire to secure by Letters Patent, is—

1. In a machine for making tile from a semiliquid compound, the combination of a chamber for containing the charge, an annular revoluble platform supported and driven at the annulus and free from central obstruction to enable workmen to stand within, a floor beneath the level of the annulus and extending within the same, molds arranged at intervals on said annulus, and driving mechanism applied to the annulus for giving it an intermittent movement to bring the molds successively into connection with said chamber, substantially as and for the purpose set forth.

2. In a machine for making tile from a semiliquid compound, the combination of a chamber for containing the charge, a movable annular platform beneath said chamber, a series of molds mounted thereon, a discharge-spout depending from said chamber, a valve controlling the discharge, a floor within and below the level of said platform, a hand-lever for operating said valve extending within reaching distance of the floor, and means for supporting and intermittently turning said platform not obstructing the space within said annulus above said floor, substantially as and for the purpose set forth.

3. In a tile-making machine, the combination of a mixing-chamber, a stirrer therein, means for actuating the stirrer, a movable annular platform beneath said mixing-chamber, a series of molds mounted thereon, a discharge-spout communicating with the mixing-chamber, a valve controlling the discharge, a floor below the level of and extending within said annular platform, a hand-lever for operating said valve extending within reaching distance of a workman on said floor, supporting and driving mechanism for said platform not obstructing the space within the annulus above the floor, and means extending within reach of a workman standing within the annulus for causing said driving mechanism to advance the platform to bring a new mold beneath the mixing-chamber, substantially as and for the purpose set forth.

4. In a tile-making machine, the combination of a mixing-chamber, a stirrer therein, a movable annular platform beneath said mixing-chamber, a series of molds mounted thereon, a discharge-spout communicating with the mixing-chamber, a valve controlling the discharge, a floor below the level of said annular platform and extending within the same, a hand-lever for operating said valve extending within reaching distance of the floor, driving means for the stirrer, driving mechanism for the platform, and means for connecting the driving mechanism of the platform with the driving mechanism of the stirrer and within the control of the person operating said valve, substantially as and for the purpose set forth.

5. In a tile-making machine, the combination of a mixing-chamber, a stirrer therein, a discharge-spout therefor, a valve controlling the discharge, an annular revoluble platform beneath said discharge-spout, a series of molds upon said platform, a driving-cable extending about the periphery of said platform, a driving-pulley in the course of said driving-cable, worm-gear for operating said driving-pulley, a drive-shaft connected with the stirrer, and means for throwing said drive-shaft into connection with said worm-gear to start the platform at will, substantially as and for the purpose set forth.

6. In a tile-making machine, the combination with a revolving platform and molds mounted thereon, of a mixing device comprising a semiconical-shaped mixing-chamber, a shaft therein, transversely-extending arms contacting with the inner surfaces of the ends of said chamber and provided with chiseled edges, and helical stirring-blades fitting at the ends into said arms and contacting at their outer edges with the conical surface of said chamber, substantially as described.

7. In a tile-making machine, the combination with the mixing-chamber, of a discharge-hose provided with a discharge-nozzle of elongated rectangular shape, and provided at its ends with discharge-orifices, substantially as described.

8. A mold comprising a bottom piece rigidly secured to a suitable standard, end pieces for the mold, side pieces hinged to the bottom of the mold, a rock-shaft journaled in said standard and connected with said hinges, and means for rocking the shaft to simultaneously open or close the sides of the mold, substantially as and for the purpose set forth.

9. A mold comprising a bottom piece rigidly secured to suitable standards, end pieces hinged to the bottom of the mold, lever-and-rod mechanism connecting the hinges thereof, a lever for simultaneously opening or closing the hinges, a rock-shaft journaled in the standard, side pieces hinged to the bottom of the mold, arms rigid with the rock-shaft and links connecting said arms with the hinges on the side pieces, whereby the side pieces may be simultaneously opened or closed, substantially as and for the purpose set forth.

10. In a tile-making machine, the combination with a revoluble platform, of a chair I, supplied with end standards $I^3 I^4$, a rock-shaft K journaled in the end standards, a longitudinally-central standard $I^2$ upon the chair, a lever $r^4$ fulcrumed thereon, connecting-rods $r^3$ joined to the ends of said lever, a mold-bottom rigidly joined to said end standards, end pieces $J'$ hinged to said mold-bottom, arms $r^2$ upon the hinges thereof connected to the rods $r^3$, side pieces hinged to the mold-bottom, collars provided with lever-arms rigidly secured to the rock-shaft, links joining said lever-arms to the hinges of the side pieces, and means for rocking the shaft, substantially as and for the purpose set forth.

JAMES B. SEAGER.

In presence of—
R. T. SPENCER,
DAN. W. LEE.